US005427160A

United States Patent [19]

Carson et al.

[11] Patent Number: 5,427,160

[45] Date of Patent: Jun. 27, 1995

[54] METHOD OF FILLING A CONTAINER

[75] Inventors: Terry D. Carson, Greenville, S.C.; Joseph J. Okladek, Montclair, N.J.; William A. Crable, Jr., Pearl River, N.Y.

[73] Assignee: TRW Vehicle Safety Systems Inc., Lyndhurst, Ohio

[21] Appl. No.: 135,293

[22] Filed: Oct. 12, 1993

[51] Int. Cl.$^6$ .......... G05D 11/03

[52] U.S. Cl. .......... 141/4; 141/9; 141/39; 141/105; 137/7

[58] Field of Search .......... 141/1, 2, 3, 9, 18, 141/21, 100, 39, 4, 104, 105; 137/7, 88; 128/203.14, 203.24, 203.28

[56] References Cited

U.S. PATENT DOCUMENTS

| | | | |
|---|---|---|---|
| 3,593,735 | 7/1968 | Reiher | 137/88 |
| 4,023,587 | 5/1977 | Dobritz | 137/88 |
| 4,219,038 | 8/1980 | Lubitzsch et al. | 137/7 |
| 4,474,547 | 10/1984 | Drexel et al. | 137/7 |
| 4,860,803 | 8/1989 | Wells | 141/9 |

*Primary Examiner*—Henry J. Recla
*Assistant Examiner*—Steven O. Douglas
*Attorney, Agent, or Firm*—Tarolli, Sundheim & Covell

[57] ABSTRACT

A storage container (12) is filled with a combustible mixture of gases including a flammable gas and a primary gas which contains an oxidizer gas. The primary gas is conducted from a source (16) of the primary gas to an intermediate primary gas container (22). The flammable gas is conducted from a source (18) of flammable gas to an intermediate flammable gas container (24). The primary gas is conducted to the storage container (12) from the intermediate primary gas container (22). Similarly, the flammable gas is conducted to the storage container (12) from the intermediate flammable gas container (24). Preferably, the flammable gas is conducted to the storage container (12) before the primary gas is conducted to the storage container. The storage container (12) is filled relatively quickly, in less than four minutes, and, in one embodiment, in approximately 1.2 minutes.

31 Claims, 1 Drawing Sheet

METHOD OF FILLING A CONTAINER

BACKGROUND OF THE INVENTION

The present invention relates to a new and improved method of filing a container with gases, and more specifically to a method of filling a container with a combustible mixture of gases accurately, repeatedly, and quickly.

In U.S. patent application Ser. No. 947,147, filed Sep. 18, 1992 by Blumenthal et al. and entitled "Apparatus for Inflating a Vehicle Occupant Restraint" (now U.S. Pat. No. 5,348,344), a source of inflation fluid for an air bag is a gas storage container which contains a combustible gas mixture. The combustible gas mixture includes a flammable gas and a primary gas, such as air, which contains an oxidizer gas, such as oxygen.

Using previously known techniques, a substantial amount of the has been required to fill a storage container with a combustible gas mixture. This is because excessive heating of the flammable gas and the mixture of combustible gases must be avoided to prevent ignition of the flammable gas and/or ignition of the mixture of combustible gases. With one known storage container filling system, approximately forty minutes is required to fill the storage container with the combustible gas mixture.

SUMMARY OF THE INVENTION

The present invention provides a new and improved method of filling a storage container with a mixture of gases, and particularly a combustible mixture of gases.

During filling of the storage container, an oxidizer gas is conducted from a source of the oxidizer gas to a first intermediate container. A flammable gas is conducted from a source of the flammable gas to a second intermediate container. The oxidizer gas is conducted from the first intermediate container to the storage container. The flammable gas is conducted from the second intermediate container to the storage container. Preferably, the flammable gas is conducted from the second intermediate container to the storage container before the oxidizer gas is conducted from the first intermediate container to the storage container.

The first intermediate container holds a smaller volume of oxidizer gas at a lower pressure than the source of oxidizer gas. The second intermediate container holds a smaller volume of flammable gas at a lower pressure than the source of flammable gas. During filling of the storage container, the intermediate containers are not in fluid communication with the gas sources, and therefore, the fluid pressures in the intermediate containers decrease. The use of the intermediate containers enables the amount of oxidizer gas and flammable gas conducted to the storage container to be accurately controlled, while maintaining a high rate of filing.

During the conduction of flammable gas to the storage container, the fluid pressure in the storage container increases at a rate of at least 75 psi per second. During the conduction of oxidizer gas to the storage container, the fluid pressure in the storage container increases at a rate of at least 200 psi per second. The time required to fill the storage container with the oxidizer gas is less than three minutes. The time required to fill the storage container with the flammable gas is less than one minute. In one specific process which was conducted in accordance with the present invention, a storage container was filled with the combustible mixture of gases in approximately 1.2 minutes.

BRIEF DESCRIPTION OF THE DRAWINGS

The foregoing and other features of the present invention will become more apparent to those skilled in the art to which the present invention relates from reading the following specification with reference to the accompanying drawings, in which.

DESCRIPTION OF AN EMBODIMENT OF THE INVENTION

Figure 1:
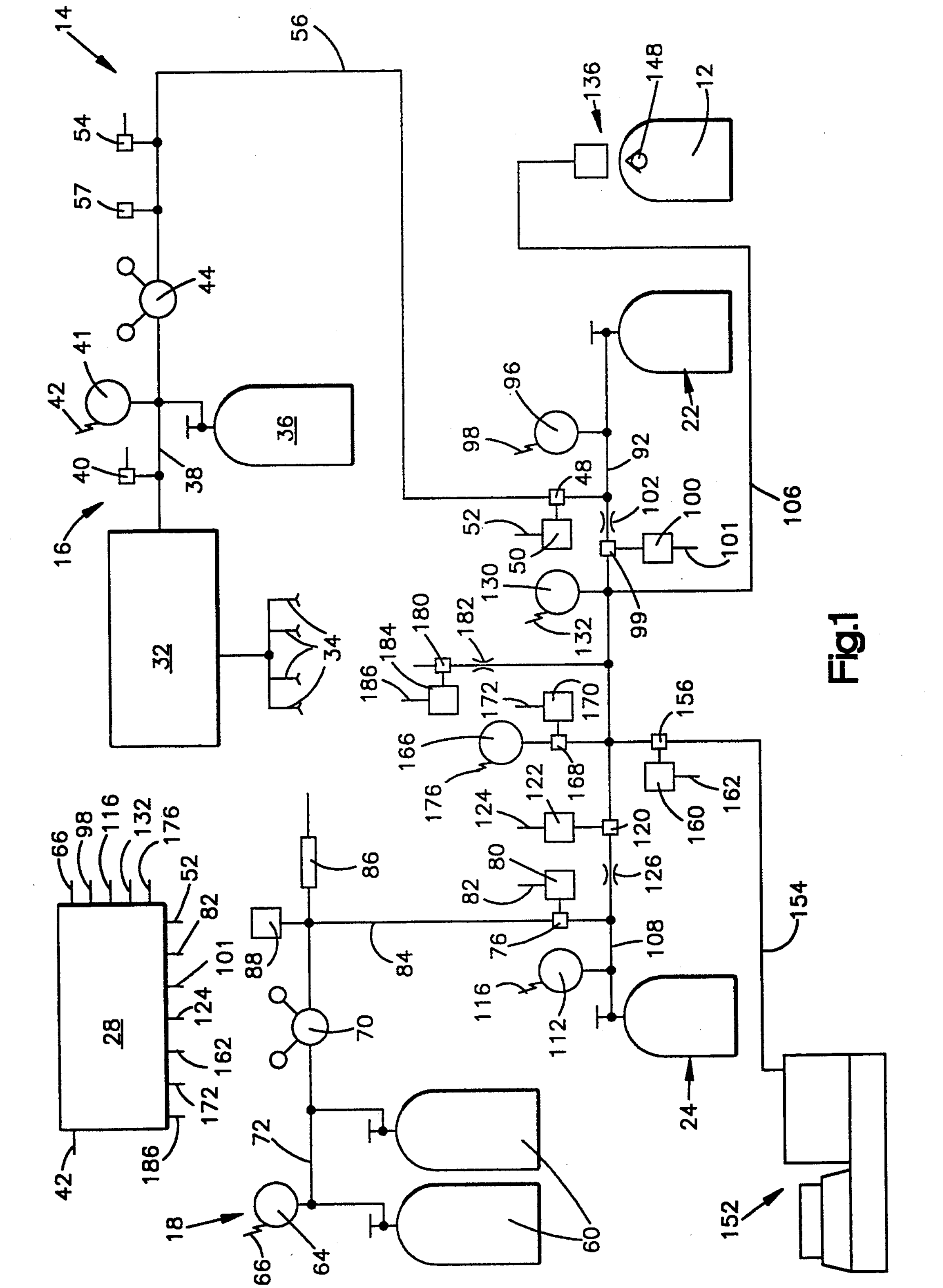
FIG. 1 is a schematic illustration of an apparatus which is operated in accordance with the present invention to fill a storage container with a combustible mixture of gases.

A gas storage container 12 (lower right corner of FIG. 1) is intended for use in a vehicle occupant restraint system, such as an air bag system. Upon the occurrence of a high rate of vehicle deceleration which is indicative of a vehicle collision, a vehicle occupant restraint, such as an air bag, is inflated by gas from the storage container 12 to restrain movement of an occupant of the vehicle. The inflatable vehicle occupant restraint is inflated into a location in the vehicle between the occupant and certain parts of the vehicle, such as the steering wheel, instrument panel or the like. The inflated vehicle occupant restraint absorbs kinetic energy of the occupant's movement and restrains the occupant's movement so that the occupant does not forcibly strike parts of the vehicle.

The storage container 12 holds a combustible mixture of gases. The combustible mixture of gases held by the storage container 12 includes a primary gas, which comprises the majority of the gas for inflating the vehicle occupant restraint, and a flammable gas which, when ignited, heats the primary gas. The mixture of stored gases in the storage container 12 is in a homogeneous gaseous state after the storage container is filled. The primary gas preferably includes an oxidizer gas for supporting combustion of the flammable gas and an inert gas for inflating the vehicle occupant restraint. The primary gas may include air or an inert gas or a mixture of air and an inert gas. The inert gas may be nitrogen, argon or a mixture of nitrogen and argon. Preferably, the primary gas is air. The oxidizer gas is the oxygen in the air. The flammable gas is hydrogen, methane or a mixture of hydrogen and methane. Preferably, the flammable gas is hydrogen. A typical composition of the mixture of gases in the storage container 12 is about 12% by volume hydrogen and 88% by volume air. The mixture of gases is stored in the storage container 12 at a pressure of approximately 2,500 psi.

The manner in which the mixture of gases stored in the storage container 12 is used to inflate a vehicle occupant restraint is the same as is disclosed in the aforementioned U.S. patent application Ser. No. 947,147 filed Sep. 18, 1992 by Blumenthal et al. and entitled "Apparatus for Inflating a Vehicle Occupant Restraint" (now U.S. Pat. No. 5,348,344). In the event of a vehicle collision, the container 12 is opened and the combustible mixture of gases is ignited. The mixture of gases is directed into the inflatable vehicle occupant restraint to inflate the vehicle occupant restraint.

An apparatus 14 for filling the storage container 12 with a combustible mixture of gases is illustrated schematically in FIG. 1. The apparatus 14 includes a source 16 of primary gas, which is typically air. The primary gas contains an oxidizer gas, which is typically the oxygen in the air. The apparatus 14 also includes a source 18 of flammable gas, which is hydrogen. A controller 28 is connected to suitable valves and pressure transducers, to be described below, to control the flow of gas from the apparatus 14 to the storage container 12.

An intermediate primary gas container 22 is provided between the source 16 of primary gas and the storage container 12. An intermediate flammable gas container 24 is provided between the source 18 of flammable gas and the storage container 12.

The intermediate primary gas container 22 and the intermediate flammable gas container 24 both have a volume which is more than five times the volume of the storage container 12. One storage container 12 has a volume of about 650 cubic centimeters.

The source 16 of primary gas includes a compressor 32. The compressor 32 is supplied with clean primary gas, which is typically air, through conduits 34. The conduits 34 are connected to containers (not shown) of the primary gas. Thus, the conduits 34 are connected to tanks of clean air. However, if desired, the use of tanks of clean air as a supply for the compressor 32 could be omitted. If this were done, the compressor would be fitted with suitable filters and scrubbers and would obtain air from the atmosphere. Alternatively, the compressor 32 could be eliminated if the pressure in the air supply tanks is sufficiently high.

A primary gas storage container 36 is connected to the compressor 32 by a conduit 38. The primary gas storage container 36 functions as a reservoir and holds a relatively large volume, 400 cubic feet, for example, of the primary gas, which the primary gas storage container 36 receives from the compressor through conduit 38. A pressure relief valve 40 may be connected to the conduit 38 between the compressor 32 and the primary gas storage container 36. The fluid pressure in the conduit 38 is measured by a transducer 41 and transmitted over a lead to the controller 28.

A pressure reducing valve 44 reduces the fluid pressure conducted from the source 16 of primary gas to the intermediate gas container 22. The pressure reducing valve 44 is connected to the intermediate primary gas container 22 through a flow control valve 48 in a conduit 56. The flow control valve 48 is actuated between open and closed conditions by an operator 50. The operator 50 is connected to the controller 28 over a lead indicated schematically at 52 in FIG. 1.

A pressure relief valve 54 may be provided in the conduit 56 between the flow control valve 48 and the pressure reducing valve 44. In the event of failure of the pressure reducing valve 44 and the pressure in line 56 increases to a high degree, the relief valve 54 will vent the high pressure in line 56. A pressure indicator 57 is provided in association with the pressure relief valve 54.

The intermediate primary gas container 22 is connected to the flow control valve 48 by a conduit 92. In one embodiment of the invention, the total length of the conduits connecting the source 16 of primary gas to the intermediate primary gas container 22 is approximately thirty-five feet.

A pressure transducer 96 is connected to the conduit 92 and has an output which is conducted over a lead indicated schematically at 98 to the controller 28. The output from the pressure transducer 96 is indicative of the fluid pressure in the intermediate primary gas container 22.

The source 18 of flammable gas includes flammable gas storage containers 60. Although a pair of flammable gas storage containers 60 are illustrated in FIG. 1, it should be understood that a single flammable gas storage container or more than two flammable gas storage containers 60 could be utilized if desired. Plural gas storage containers 60 are preferred so that they may be sequentially switched into the system by valving (not shown) as the supply of flammable gas in one of the flammable gas storage containers is reduced.

The fluid pressure supplied by the flammable gas storage containers 60 is measured by a transducer 64 and transmitted to the controller 28 over a lead 66. A pressure reducing valve 70 is provided between the flammable gas storage containers 60 and the intermediate flammable gas container 24. The pressure reducing valve 70 is connected to the flammable gas storage containers 60 by a conduit 72.

A flow control valve 76 controls the flow of gas from the flammable gas storage containers 60 to the intermediate flammable gas container 24. The flow control valve 76 is actuated between open and closed conditions by an operator 80. The operator 80 is connected to the controller 28 by a lead indicated schematically at 82.

The flow control valve 76 is connected to the pressure reducing valve 70 by a conduit 84. A pressure relief valve 86 is connected to the conduit 84 to vent excessive fluid pressure to the atmosphere in the event of failure of regulator 70. A pressure indicator 88 is provided in association with the pressure relief valve 86.

The intermediate flammable gas container 24 is connected to the flow control valve 76 by a conduit 108. In one embodiment of the invention, the intermediate flammable gas container 24 is connected to the source 18 of flammable gas by approximately thirty-five feet of conduit. Thus, the combined length of the conduit 108 and the conduit 84 is approximately thirty-five feet.

The relatively long conduits between the flammable gas container 24 and the source 18 of flammable gas and between the primary gas source 16 and the primary gas container 22 enable the primary gas source 16 and the flammable gas source 18 to be isolated from the area where the storage container 12 is filled for safety reasons. The longer the conduit through which the primary gas and the flammable gas are conducted, however, the greater will be the heat transfer which is imparted to the primary gas and the flammable gas as they are conducted through the conduits.

A pressure transducer 112 measures the fluid pressure in the conduit 108 and the intermediate flammable gas container 24. The pressure transducer 112 provides an output over a lead, indicated schematically 116, to the controller 28. The output from the transducer 112 is indicative of the fluid pressure in the intermediate flammable gas container 24.

A flow control valve 99 controls the flow of gas from the intermediate primary gas container 22 to the storage container 12. The flow control valve 99 is actuated between open and closed conditions by an operator 100. The operator 100 is connected to the controller 28 by a lead indicated schematically at 101. A flow control orifice 102 works with the flow control valve 99 to control the rate of flow of gas from the intermediate primary gas container 22 to the storage container 12 through a fill conduit 106.

A flow control valve 120 controls the flow of flammable gas from the intermediate flammable gas container 24 to the fill conduit 106. The flow control valve 120 is actuated between open and closed conditions by an operator 122. The operator 122 is connected to the controller 28 by a lead indicated schematically at 124 in FIG. 1. A flow control orifice 126 cooperates with the flow control valve 120 to control the rate of flow of flammable gas from the intermediate flammable gas container 24 to the fill conduit 106.

The fill conduit 106 is connected to the primary gas flow control valve 99 and the flammable gas flow control valve 120. The length of conduit from the intermediate primary gas container 22 through the fill conduit 106 to the storage container 12 is less than five feet. Similarly, the length of conduit from the intermediate flammable gas container 24 through the fill conduit 106 to the storage container 12 is less than five feet. By minimizing the length of the conduit required to conduct gas from the intermediate primary gas container 22 and from the intermediate flammable gas container 24 to the storage container 12, heating of the gas as it flows through the conduit is minimized.

A transducer 130 measures the fluid pressure in the fill conduit 106. An output signal from the transducer 130 is conducted over a lead, indicated schematically at 132, to the controller 28. The transducer 130 is designed to respond to relatively high pressures.

A fill head 136 is utilized to connect the fill conduit 106 with the storage container 12. In the illustrated embodiment, the fill head seals against the storage container 12 and has a passage for directing gas into the storage container. A check valve 148 is provided within the storage container 12 to prevent a flow of fluid from the storage container when the fill head 136 is disconnected from the storage container 12.

A vacuum pump 152 is connected in fluid communication to the fill conduit 106 through a conduit 154. A vacuum control valve 156 is connected to the vacuum pump 152 through the conduit 154. The vacuum control valve 156 is actuated between open and closed conditions by an operator 160. The operator 160 is connected to the controller 28 by a lead 162.

A transducer 166 is connected to the fill conduit 106 through a transducer isolation valve 168. The transducer isolation valve 168 is actuated between open and closed conditions by an operator 170. The operator 170 is connected to the controller 28 by a lead 172. When the transducer isolation valve 168 is in the open condition, the transducer 166 measures the fluid pressure in the fill conduit 106. An output signal indicative of the fluid pressure in the fill conduit 106 is transmitted from the transducer 166 to the controller 28 over a lead indicated schematically at 176.

A vent valve 180 is connected to the fill conduit 106 through a flow control orifice 182. The vent valve 180 is actuated between open and closed conditions by an operator 184. The operator 184 is connected to the controller 28 by a lead 186. When the vent valve 180 is in an open condition, the fill conduit 106 is vented to atmosphere.

The various components of the apparatus 14 are made of materials which are not affected by the gas to which they are exposed. Thus, the conduit and containers exposed to the flammable gas are formed of stainless steel.

The operation of the apparatus will be described starting from a condition in which all of the flow control valves are in a closed condition. Thus, the flow control valve 48 and the flow control valve 99 for the primary gas are closed. Similarly, the flow control valve 76 and the flow control valve 120 for the flammable gas are closed. At this time, the vacuum control valve 156 is closed and the transducer isolation valve 168 is open. The vent valve 180 is closed, and the fill conduit 106 contains air at atmospheric pressure.

The primary gas storage container 36 contains primary gas at a relatively high pressure, that is, approximately 4,500 psi. At this time, the fluid pressure in the intermediate primary gas container 22 is about 3,000 psi. The flammable gas storage containers 60 contain flammable gas at a pressure of about 2,200 to 2,300 psi. At this time, the intermediate flammable gas container 24 contains gas at a pressure of about 335 psi.

Before the apparatus 14 is to be used to fill a storage container 12, the intermediate primary gas container 22 and the intermediate flammable gas container 24 are both partially filled and need to be topped off. Accordingly, the controller 28 effects operation of the operator 50 to actuate the flow control valve 48 to an open condition, while the flow control valve 99 remains in a closed condition. Gas thus flows from the primary gas storage container 36 through the pressure reducing valve 44 to the intermediate primary gas container 22. The primary gas flows from the pressure reducing valve through the flow control valve 48 into the intermediate primary gas container 22 until the transducer 96 transmits a signal to the controller 28 indicating that a predetermined desired pressure has been obtained in the intermediate primary gas container 22. The pressure in the primary gas storage container 36 is greater than the pressure in the intermediate primary gas container 22 during topping off of the intermediate primary gas container.

In one specific embodiment of the apparatus 14, the pressure reducing valve 44 reduces the relatively high primary gas storage container pressure of 4,500 psi to about 3,500 psi. In addition, the controller 28 effects operation of the operator 50 to close the flow control valve 48 when the output from the transducer 96 indicates that the fluid pressure in the intermediate primary gas container 22 is 3,300 psi.

As the primary gas is conducted from the pressure reducing valve 44 to the intermediate primary gas container 22 through the conduits 56 and 92, the temperature of the gas increases. However, after the flow control valve 48 has closed, the primary gas has time to cool in the container 22.

Simultaneously with the topping off of the intermediate primary gas container 22, the intermediate flammable gas container 24, which is partially filled, is topped off. To top off the intermediate flammable gas container 24, the controller 28 effects operation of the operator 80 to actuate the flow control valve 76 to an open condition, while the flow control valve 120 remains in a closed condition. Flammable gas thus flows from a flammable gas storage container 60 (the one switched into the system) through the pressure reducing valve 70 to the intermediate flammable gas container 24. The flammable gas is conducted through the open flow control valve 76 to the container 24 until the transducer 112 indicates to the controller 28 that a predetermined pressure has been obtained in the intermediate flammable gas container. The pressure in the flammable gas storage container 60 is greater than the pressure in the intermediate flammable gas container 24 during topping off of the intermediate flammable gas container.

In one embodiment of the apparatus 14, the flammable gas storage containers 60 hold flammable gas at a pressure of about 3,000 psi. The pressure reducing valve 70 reduces the fluid pressure conducted to the conduit 84 to approximately 450 psi. Further, when the intermediate flammable gas container 24 has been filled to a pressure of approximately 345 psi, the output from the transducer 112 causes the controller 28 to effect operation of the operator 80 to actuate the flow control valve 76 to a closed condition. The flow of the flammable gas through the conduits and into the intermediate flammable gas container 24 causes the temperature of the flammable gas to increase. However, after the flow control valve 76 closes, the flammable gas has time to cool in the container 24.

The foregoing explanation of the topping off of the intermediate primary gas container 22 and the intermediate flammable gas container 24 assumes that they will be simultaneously topped off before the filling of a storage container 12 is undertaken. However, it is contemplated that the intermediate primary gas container 22 and the intermediate flammable gas container 24 could be sequentially topped off during the filling of the storage container 12. Thus, the intermediate flammable gas container 24 could be topped off while a storage container 12 is being filled with the primary gas from the intermediate primary gas container 22. Similarly, the intermediate primary gas container 22 could be topped off while a storage container 12 is being filled with flammable gas from the intermediate flammable gas container 24. Therefore, the time required for topping off the intermediate primary gas container 22 and the intermediate flammable gas container 24 does not substantially increase the time required to fill a storage container 12.

A storage container 12 to be filled with gas from the intermediate flammable gas container 24 and the intermediate primary gas container 22 is located adjacent the fill head 136. The fill head 136 is sealed against the storage container to be filled. At this time, the storage container 12 contains air at one atmosphere of pressure.

The cycle of operation to fill a storage container 12 may be initiated in different ways. For example, the storage container 12 when properly positioned may trip a switch to initiate the filling of the storage container. Moreover, a manually operated switch may be actuated to initiate the filling. Alternately, each step in the cycle may be manually controlled by suitable switches.

At this time, the transducer isolation valve 168 is in an open condition connecting the transducer 166 with the fill conduit 106. The primary gas flow control valve 99, flammable gas flow control valve 120 and vent valve 180 remain closed. Therefore, the output conducted from the transducer 166 to the controller 28 indicates that the fill conduit 106 is at atmospheric pressure.

The controller 28 then effects operation of the operator 160 to actuate the vacuum control valve 156 to an open condition. The vacuum pump 152 is then effective to evacuate the fill conduit 106. At this time, the fill head 136 is sealed against the container 12 and the check valve 148 in the storage container 12 blocks evacuation of the storage container. After the output from the transducer 166 indicates to the controller 28 that a predetermined subatmospheric pressure has been obtained in the fill conduit 106, the controller effects operation of the operator 160 to actuate the vacuum control valve 156 to a closed condition.

It is preferred to fill the storage container 12 with the flammable gas from the intermediate flammable gas container 24 before the storage container 12 is filled with the primary gas from the intermediate primary gas container 22. To fill the storage container 12 with flammable gas through the evacuated fill conduit 106, the controller 28 activates the operator 122 to actuate the flow control valve 120 from the closed condition to the open condition. The flow control valve 76 remains in a closed condition.

Flammable gas flows from the intermediate flammable gas container 24 through the flow control orifice 126 and open flow control valve 120 to the fill conduit 106. The flammable gas is conducted from the fill conduit 106 through the fill head 136 and the check valve 148 into the storage container 12. Although the orifice 126 limits the rate of flow of the flammable gas, the storage container 12 is filled with the flammable gas in less than one minute. During filling of the storage container 12 with the flammable gas, the pressure in the storage container 12 increases at a rate of more than 300 psi per minute. The pressure in the intermediate flammable gas container 24 is greater than the pressure in the storage container 12 during filling of the storage container with flammable gas.

During operation of one embodiment of the apparatus 14, a storage container 12 having a volume of 650 cubic centimeters was filled with flammable gas to a pressure of 300 psi in two seconds. Thus, in the specific instance in which the storage container 12 was filled to a pressure which is slightly greater than 300 psi in two seconds, the average rate of increase in the fluid pressure in the storage container 12 was 9,000 psi per minute.

During filling of the storage container 12 with flammable gas, the conducting of the flammable gas through less than five feet of conduit results in the temperature of the gas increasing somewhat. Therefore, the storage container 12 is filled with flammable gas to a pressure above 300 psi. After a short time, the flammable gas cools and the pressure in the storage container 12 decreases to approximately 300 psi.

While the storage container 12 is being filled with flammable gas, the transducer isolation valve 168 is in an open condition. When the transducer 166 detects that the pressure in the fill conduit 106 and the storage container 12 has increased to 300 psi, the controller 28 effects operation of the operator 122 to close the flow control valve 120. The controller then effects operation of the operator 184 to open the vent valve 180. As the vent valve 180 begins to open, the check valve 148 in the storage container 12 closes. This results in the flammable gas being held in the storage container 12 at a pressure of 300 psi. When the pressure in the fill conduit 106 is reduced to atmospheric pressure, the vent valve 180 is closed.

The controller 28 then causes the operator 160 to actuate the vacuum control valve 156 to an open condition. The vacuum pump 152 is operated to evacuate the fill conduit 106. When the transducer 166 detects that the fill conduit 106 has again been evacuated, the controller 28 causes the operator 160 to actuate the vacuum control valve 156 to a closed condition.

Immediately thereafter, the controller 28 causes the operator 170 to actuate the transducer isolation valve 168 to a closed condition. Closing the transducer isolation valve 168 prevents the transducer 166 from being exposed to the relatively high fluid pressures which are present in the fill conduit 106 during filling of the storage container 12 with the primary gas. The transducer 166 has a very accurate output for a relatively low range of pressures, that is pressures which are subatmospheric to approximately 500 psi. The transducer 166 could be damaged by exposure to pressures in excess of approximately 500 psi.

After the storage container 12 has been filled with the flammable gas to a pressure of approximately 300 psi, the storage container is filled with primary gas until the pressure in the storage container 12 reaches approximately 2,500 psi. The 2,500 psi pressure of the mixture of gases is due to the partial flammable gas pressure of 300 psi and a partial primary gas pressure of 2,200 psi. This results in the combustible mixture of gases in the storage container 12 containing 12% flammable gas (hydrogen) and 88% primary gas (air). Thus, the combustible mixture of gases in the storage container 12 contains an amount of flammable gas, hydrogen gas, which is above 4%. If the percentage of hydrogen gas in the storage container 12 is below 4%, the hydrogen gas will not ignite.

Prior to filling the storage container 12 with the primary gas, the flow control valve 120, vacuum control valve 156, transducer isolation valve 168 and primary gas intermediate container flow control valve 48, and vent valve 180 are all closed. The controller 28 effects operation of the operator 100 to actuate the primary gas flow control valve 99 to an open condition. When this occurs, primary gas is conducted from the intermediate primary gas container 22 to the fill conduit 106. The primary gas flows from the fill conduit 106 through the check valve 148 into the storage container 12. The pressure in the intermediate primary gas container 22 is greater than the pressure in the storage container 12 during filling of the storage container with primary gas.

When the transducer 130 indicates to the controller 28 that a predetermined pressure has been obtained in the fill conduit 106 and storage container 12, the controller 28 effects operation of the operator 100 to actuate the flow control valve 99 to a closed condition. This interrupts the flow of primary gas from the intermediate primary gas container 22 to the storage container 12.

During filling of the storage container 12 with the primary gas, the fluid pressure in the storage container 12 increases at an average rate of more than 700 psi per minute and the storage container 12 is filled with the primary gas in less than three minutes. During operation of one specific embodiment of the apparatus 14, the fluid pressure in the storage container 12 was increased from the 300 psi fluid pressure of the flammable gas to approximately 2,500 psi pressure of a mixture of the flammable gas and the primary gas in six seconds. Since the partial pressure of the primary gas in the storage container 12 is 2,200 psi, the average rate of increase in the fluid pressure in the storage container 12, during filling of the storage container with the primary gas, was almost 22,000 psi per minute.

During filing of the storage container 12 with primary gas, the conducting of the primary gas through less than five feet of conduit results in the temperature of the primary gas increasing somewhat. Therefore, the storage container 12 is filled with a combustible mixture of primary gas and secondary gas to a pressure above 2,500 psi. After a short time, the combustible mixture of gases cools and the pressure in the storage container 12 decreases to approximately 2,500 psi.

After the flow control valve 99 has been closed, the controller 28 causes the operator 184 to actuate the vent control valve 180 to an open condition. At this time, the primary gas (air) is vented to the atmosphere through the orifice 182 and open vent valve 180.

Upon initiation of venting of the fill conduit 106 to the atmosphere, the check valve 145 in the storage container 12 closes. When the transducer 130 indicates to the controller 28 that the fluid pressure in the fill conduit 106 has been reduced to approximately atmospheric pressure, the controller effects operation of the actuator 184 to close the vent valve 180. The fill head 136 is then disconnected from the filled storage container 12.

The controller 28 then activates the operator 170 to actuate the transducer isolation valve 168 from the closed condition to an open condition to expose the transducer 166 to the relatively low pressure in the fill conduit 106. A new empty storage container 12 is positioned to be filled and the fill head 136 seals against the new storage container. Immediately thereafter, the controller 28 activates the operator 160 to actuate the vacuum control valve 156 to an open condition. The vacuum pump 152 can then evacuate the fill conduit 106 in preparation for the filling of the new storage container 12.

During the foregoing operation of one specific embodiment of the apparatus 14, the storage container 12 was filled with the flammable gas in two seconds and was filled with the primary gas in six seconds. The total time required to connect the storage container 12 with the socket assembly 140, fill the storage container with the flammable gas and primary gas to obtain a combustible gas mixture and then to disconnect the fill head 136 was about 1.2 minutes. Potentially, therefore, during production runs involving a large number of storage containers 12, the storage containers could be sequentially filled with the combustible mixture of gases in approximately 1.2 minutes for each container. Even if handling of the storage containers 12, connection of each container with the fill head 136 and switching between the source 16 of primary gas and the source 18 of flammable gas is conducted relatively slowly, storage containers 12 could be filled with a combustible mixture of primary gas and flammable gas in less than four minutes for each container.

The use of the intermediate primary gas container 22 and the intermediate flammable gas container 24 and associated valves and transducers enables the fast filling of the storage containers to be achieved in a safe manner. It also enables the amount of primary gas and flammable gas supplied to the storage container 12 to be accurately controlled.

The storage of gas in intermediate gas containers 22, 24 enables the gases to cool after being heated due to flow into the intermediate gas containers from the respective gas sources. Also, there is a relatively small pressure differential between the flammable gas pressure in the intermediate flammable gas container 24 and the storage tank 12 when the flow of flammable gas to the storage container is terminated by closing of the flow control valve 120. The pressure differential between the primary gas pressure in the intermediate primary gas container 22 and the storage container 12 is greater than the pressure differential between the intermediate flammable gas container 24 and the storage container 12. However, the pressure differential between intermediate primary gas container 22 and the storage container 12 is still smaller than the pressure differential between the primary gas source 16 and the storage container 12.

The relatively small pressure differentials between the intermediate primary gas container 22 and storage container 12 and the intermediate flammable gas container 24 and storage container 12 minimize the possibility of overfilling the storage container 12 with an excessive amount of either the flammable gas or the primary gas. When filling of the storage container with flammable gas is terminated, the pressure differential between the intermediate combustion gas container and the storage container 12 is relatively small to minimize the possibility of significantly overfilling the storage container 12 with the flammable gas.

When the filling of the storage gas container 12 with the primary gas is terminated, the pressure differential between the intermediate primary gas container 22 and the storage container 12 is also relatively small. Thus, even if there was a faulty operation and more primary gas was delivered to a storage container than desired, there would not be a major affect on the pressure in the storage container.

It should be understood that the foregoing specific fluid pressures, rates of change of fluid pressure, and time periods, have been set forth herein for purposes of clarity of description. It is contemplated that different fluid pressures and different rates of change of fluid pressure could be utilized during the filling of storage containers of different sizes with a mixture of a primary gas and a flammable gas. It is also contemplated that the total time required to fill a storage container with a mixture of a primary gas and a flammable gas using the method of the present invention may vary from the specific time set forth herein.

From the above description of the invention, those skilled in the art will perceive improvements, changes and modifications. Such improvements, changes and modifications within the skill of the art are intended to be covered by the appended claims.

Having described the invention, the following is claimed:

1. A method of filling a storage container with a combustible mixture of gases, said method comprising the steps of:

- conducting an oxidizer gas from a source of oxidizer gas to a first intermediate container;
- conducting a flammable gas from a source of flammable gas to a second intermediate container;
- conducting the flammable gas from the second intermediate container to the storage container, said step of conducting flammable gas from the second intermediate container to the storage container includes conducting the flammable gas through conduit which includes a fill conduit;
- evacuating the fill conduit after said step of conducting the flammable gas from the second intermediate container to the storage container;
- conducting the oxidizer gas from the first intermediate container to the storage container, said step of conducting oxidizer gas from the first intermediate container to the storage container includes conducting the oxidizer gas through conduit which includes the fill conduit which is connected in fluid communication with the storage container; and
- evacuating the fill conduit after said step of conducting the oxidizer gas from the first intermediate container to the storage container.

2. A method as set forth in claim 1 further including the steps of terminating said step of conducting a flammable gas to the second intermediate container when the fluid pressure in the second intermediate container reaches a first predetermined pressure, and terminating said step of conducting an oxidizer gas to the first intermediate container when the fluid pressure in the first intermediate container reaches a second predetermined fluid pressure.

3. A method as set forth in claim 2 further including the steps of terminating said step of conducting flammable gas from the second intermediate container to the storage container in response to the fluid pressure in the storage container being increased to a third predetermined fluid pressure which is less than the first predetermined fluid pressure, and terminating said step of conducting oxidizer gas from first intermediate container to the storage container in response to the fluid pressure in the storage container being increased to a fourth predetermined fluid pressure which is less than the second predetermined fluid pressure.

4. A method as set forth in claim 2 wherein the second predetermined fluid pressure is greater than the first predetermined fluid pressure, said step of conducting flammable gas from the second intermediate container to the storage container being completed before initiating said step of conducting oxidizer gas from the first intermediate container to the storage container.

5. A method as set forth in claim 1 wherein said step of conducting flammable gas from the second intermediate container to the storage container includes increasing the fluid pressure in the storage container at a rate of at least 300 psi per minute.

6. A method as set forth in claim 5 wherein said step of conducting oxidizer gas from the first intermediate container to the storage container includes increasing the fluid pressure in the storage container at a rate of at least 700 psi per minute.

7. A method as set forth in claim 1 wherein the oxidizer gas is air and the flammable gas is hydrogen, said method further including forming a mixture of air and hydrogen in the storage container with the mixture of air and hydrogen containing more than four percent hydrogen.

8. A method as set forth in claim 1 further including forming a mixture of oxidizer gas and flammable gas in the storage container with the concentration of flammable gas in the mixture being above the lower ignition limit of the flammable gas.

9. A method as set forth in claim 1 wherein said step of conducting the oxidizer gas from the first intermediate container to the storage container is performed in less than three minutes, said step of conducting the combustible gas from the second intermediate container to the storage container is performed in less than one minute.

10. A method as set forth in claim 1 wherein said step of conducting the oxidizer gas from the first intermediate container to the storage container includes conducting the oxidizer gas through conduit having a length of less than five feet, said step of conducting the flammable gas from the second intermediate container to the storage container includes conducting the flammable gas through conduit having a length of less than five feet.

11. A method as set forth in claim 10 wherein said step of conducting the oxidizer gas from a source of oxidizer gas to the first intermediate container includes conducting the oxidizer gas through conduit having a length of more than ten feet, said step of conducting the combustible gas from a source of flammable gas to the second intermediate container includes conducting the combustible gas through conduit having a length of more than ten feet.

12. A method as set forth in claim 1 wherein said first and second intermediate containers have a volume which is at least five times the volume of said storage container.

13. A method as set forth in claim 1 wherein said step of conducting oxidizer gas from the first intermediate container to the storage container includes maintaining the fluid pressure in the first intermediate container at a pressure which is greater than the pressure in the storage container at any time during performance of said step of conducting oxidizer gas from the first intermediate container to the storage container, said step of conducting flammable gas from the second intermediate container to the storage container includes maintaining the fluid pressure in the second intermediate container at a pressure which is greater than the pressure in the storage container at any time during performance of said step of conducting flammable gas from the second intermediate container to the storage container.

14. A method as set forth in claim 13 wherein said step of conducting an oxidizer gas from a source of oxidizer gas to a first intermediate container is completed before initiating said step of conducting the oxidizer gas from the first intermediate container to the storage container, said step of conducting a flammable gas from a source of flammable gas to a second intermediate container being completed before initiating said step of conducting flammable gas from the second intermediate container to the storage container.

15. A method as set forth in claim 1 wherein said step of conducting the flammable gas from the second intermediate container to the storage container is performed prior to performance of said step of conducting the oxidizer gas from the first intermediate container to the storage container.

16. A method of filling a storage container with a mixture of gases, said method comprising the steps of:

conducting a first gas to the storage container, said step of conducting a first gas to the storage container includes conducting the first gas from a first intermediate container to the storage container;

detecting when the fluid pressure in the storage container reaches a first predetermined pressure;

terminating said step of conducting a first gas to the storage container in response to detecting that the fluid pressure in the storage container has reached the first predetermined pressure;

thereafter, conducting a second gas to the storage container, said step of conducting a second gas to the storage container includes conducting the second gas from a second intermediate container to the storage container;

detecting when the fluid pressure in the storage container reaches a second predetermined pressure which is greater than the first predetermined pressure;

terminating said step of conducting a second gas to the storage container in response to detecting that the fluid pressure in the storage container has reached the second predetermined pressure;

conducting a first gas from a source of the first gas to a first intermediate container;

detecting when the fluid pressure in the first intermediate container reaches a third predetermined pressure which is greater than the first predetermined pressure and less than the second predetermined pressure;

terminating said step of conducting the first gas from the source of the first gas to the first intermediate container in response to detecting that the fluid pressure in the first intermediate container has reached the third predetermined pressure;

conducting the second gas from a source of the second gas to the second intermediate container;

detecting when the fluid pressure in the second intermediate container reaches a fourth predetermined pressure which is greater than the second predetermined pressure; and terminating said step of conducting the second gas from the source of the second gas to the second intermediate container in response to detecting that the fluid pressure in the second intermediate container has reached the fourth predetermined pressure.

17. A method as set forth in claim 16 wherein said step of conducting a first gas to the storage container includes increasing the fluid pressure in the storage container at a rate of at least 300 psi per minute.

18. A method as set forth in claim 17 wherein said step of conducting a second gas to the storage container includes increasing the fluid pressure in the storage container at a rate of at least 700 psi per minute.

19. A method as set forth in claim 18 wherein said step of conducting a first gas to the storage container is performed in less than one minute, said step of conducting a second gas to the storage container being performed in less than three minutes.

20. A method as set forth in claim 16 wherein said first gas is a flammable gas and said second gas includes an oxidizer gas.

21. A method of filling a storage container with a mixture of combustible gasses, said method comprising the steps of:

conducting an oxidizer gas from a source of oxidizer gas to a first intermediate container, terminating said step of conducting the oxidizer gas to the first intermediate container, conducting a flammable gas from a source of flammable gas to a second intermediate container, terminating said step of conducting the flammable gas to the second intermediate container, conducting the flammable gas from the second intermediate container to a storage container, terminating said step of conducting the flammable gas to the storage container, after terminating said step of conducting flammable gas to the storage container, conducting the oxidizer gas from the first intermediate container to the storage container, and terminating said step of conducting the oxidizer gas to the storage container.

22. A method as set forth in claim 21 further including the steps of blocking fluid flow between the first and second intermediate containers and between the first intermediate container and the storage container during performance of said step of conducting flammable gas from the second intermediate container to the storage container, and blocking fluid flow between the first and second intermediate containers and between the second intermediate container and the storage container during performance of said step of conducting oxidizer gas from the first intermediate container to the storage container.

23. A method as set forth in claim 21 whereby said step of conducting oxidizer gas from the source of oxidizer gas to the first intermediate container is terminated when the fluid pressure within the first intermediate container reaches a first predetermined pressure, said step of conducting flammable gas from the source of flammable gas to the second intermediate container is terminated when the fluid pressure within the second intermediate container reaches a second predetermined pressure, said step of conducting the flammable gas from the second intermediate container to the storage container is terminated when the fluid pressure within the storage container reaches a third predetermined pressure which is less than the first predetermined pressure, and said step of conducting oxidizer gas from the first intermediate container to the storage container is terminated when the fluid pressure within the storage container reaches a fourth predetermined pressure which is greater than the second and third predetermined pressures.

24. A method as set forth in claim 21 wherein said step of conducting flammable gas from the second intermediate container to the storage container increases the fluid pressure within the storage container at a first rate and said step of conducting oxidizer gas from the first intermediate container to the storage container increases the fluid pressure within the storage container at a second rate which is at least twice as great as the first rate.

25. A method as set forth in claim 21 further including forming a mixture of oxidizer gas and flammable gas in the storage container with the concentration of flammable gas in the mixture being above the lower ignition limit of the flammable gas.

26. A method as set forth in claim 21 wherein the oxidizer gas is air and the flammable gas is hydrogen, said method further including forming a mixture of air and hydrogen in the storage container with the mixture of air and hydrogen containing more than four percent hydrogen.

27. A method as set forth in claim 21 wherein said step of conducting the oxidizer gas from the first intermediate container to the storage container is performed in less than three minutes, said step of conducting the flammable gas from the second intermediate container to the storage container is performed in less than one minute.

28. A method as set forth in claim 21 wherein said step of conducting the flammable gas from the second intermediate container to a storage container includes conducting the flammable gas through a fill conduit, said step of conducting the oxidizer gas from the first intermediate container to the storage container includes conducting the oxidizer gas through the fill conduit, said method further including evacuating the fill conduit after terminating said step of conducting the flammable gas to the storage container and prior to conducting the oxidizer gas through the fill conduit.

29. A method of filling a storage container with a mixture of combustible gasses, said method comprising the steps of:

conducting an oxidizer gas from a source of oxidizer gas to a first intermediate container;

terminating said step of conducting the oxidizer gas to the first intermediate container when the fluid pressure within the first intermediate container reaches a first predetermined pressure;

conducting a flammable gas from a source of flammable gas to a second intermediate container;

terminating said step of conducting the flammable gas to the second intermediate container when the fluid pressure within the second intermediate container reaches a second predetermined pressure;

conducting the flammable gas from the second intermediate container to a storage container;

terminating said step of conducting the flammable gas to the storage container when the fluid pressure within the storage container reaches a third predetermined pressure which is less than the first and second predetermined pressures;

conducting the oxidizer gas from the first intermediate container to the storage container; and terminating said step of conducting the oxidizer gas to the storage container when the fluid pressure within the storage container reaches a fourth predetermined pressure which is greater than the second and third predetermined pressures and less than the first predetermined pressure.

30. A method as set forth in claim 29 wherein said step of conducting the oxidizer gas from the first intermediate container to the storage container is performed in less than three minutes, said step of conducting the flammable gas from the second intermediate container to the storage container is performed in less than one minute.

31. A method as set forth in claim 29 wherein said step of conducting flammable gas from the second intermediate container to the storage container increases the fluid pressure within the storage container at a first rate and said step of conducting oxidizer gas from the first intermediate container to the storage container increases the fluid pressure within the storage container at a second rate which is at least twice as great as the first rate.

* * * * *